US012730000B2

(12) United States Patent
Tonami et al.

(10) Patent No.: US 12,730,000 B2
(45) Date of Patent: Sep. 8, 2026

(54) EVENT RECOGNITION APPARATUS, EVENT RECOGNITION METHOD, AND NON-TRANSITORY COMPUTER-READABLE MEDIUM

(71) Applicant: NEC Corporation, Tokyo (JP)

(72) Inventors: Noriyuki Tonami, Tokyo (JP); Sakiko Mishima, Tokyo (JP); Takashi Matsushita, Tokyo (JP); Reishi Kondo, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 18/668,375

(22) Filed: May 20, 2024

(65) Prior Publication Data

US 2024/0402003 A1 Dec. 5, 2024

(30) Foreign Application Priority Data

May 31, 2023 (JP) ................................. 2023-089414

(51) Int. Cl.
*G01H 9/00* (2006.01)
*G06N 20/00* (2019.01)
*H04R 23/00* (2006.01)

(52) U.S. Cl.
CPC ............. *G01H 9/004* (2013.01); *G06N 20/00* (2019.01); *H04R 23/008* (2013.01)

(58) Field of Classification Search
CPC ........ G01H 9/004; G01H 17/00; G01H 9/006; G01H 11/06; G01H 9/00; G01H 1/00; G01H 3/08; G01H 1/003; G01H 3/04; G06N 3/0464; G06N 3/045; G06N 20/00; G06N 3/08; G06N 3/0442; G06N 3/084; G06N 7/01; G06N 3/006; G06N 3/042; G06N 3/044; G06N 3/047; G06N 3/09; G06N 3/02; G06N 3/048; G06N 3/049;
(Continued)

(56) References Cited

U.S. PATENT DOCUMENTS

| | | | | |
|---|---|---|---|---|
| 4,313,185 | A * | 1/1982 | Chovan | G01H 9/006 356/477 |
| 8,712,740 | B2 * | 4/2014 | Morio | G10L 15/20 703/2 |
| 2025/0271296 | A1 * | 8/2025 | Tonami | G01H 9/004 |

FOREIGN PATENT DOCUMENTS

| | | | | |
|---|---|---|---|---|
| CN | 117516690 A | * | 2/2024 | G06N 20/00 |
| CN | 120354053 A | * | 7/2025 | G01H 9/004 |

(Continued)

*Primary Examiner* — Andre J Allen
(74) *Attorney, Agent, or Firm* — Sughrue Mion, PLLC

(57) ABSTRACT

An event recognition apparatus is configured to acquire an observation signal indicating sound or vibration that occurs at a point along an optical fiber and is detected by optical fiber sensing, also acquire a noise signal indicating optical noise present at a point along the optical fiber, and by using statistical information of a sound signal or a vibration signal acquired by a sound sensor or a vibration sensor, derive, from each of the observation signal and the noise signal, a posterior probability that at least one event occurs at a point along the optical fiber, and compare a posterior probability derived from the observation signal with a posterior probability derived from the noise signal, derive, from a result of the comparison, a posterior probability that the at least one event occurs at a point along the optical fiber, and output a result of the derivation.

15 Claims, 9 Drawing Sheets

(58) Field of Classification Search

CPC .......... G06N 3/088; G06N 3/126; G06N 5/04; G06N 5/046; G06N 20/10; G06N 20/20; G06N 3/043; G06N 3/0499; G06N 3/086; G06N 3/092; G06N 5/01; G06N 3/082; G06N 3/096; G06N 5/022; G06N 5/025; H04R 2460/13; H04R 3/005; H04R 25/606; H04R 1/00; H04R 1/1075; H04R 9/02; H04R 1/10; H04R 1/1041; H04R 1/1083; H04R 11/02; H04R 23/008; H04R 25/50; H04R 25/607; H04R 3/02; H04R 3/14; H04R 9/066; H04R 1/025; H04R 1/08; H04R 1/1008; H04R 1/105; H04R 1/1091; H04R 1/2811; H04R 1/288; H04R 15/00; H04R 2225/43; H04R 2430/03; H04R 25/00; H04R 29/001; H04R 3/04; H04R 3/12; H04R 31/00; H04R 5/033; H04R 9/025; H04R 9/06; H04R 9/063; H04R 1/2834; H04R 1/406; H04R 2400/03; H04R 2400/07; H04R 2410/05; H04R 2420/01; H04R 2430/20; H04R 2460/01; H04R 2499/13; H04R 25/48; H04R 25/554; H04R 25/604

See application file for complete search history.

(56) References Cited

FOREIGN PATENT DOCUMENTS

| | | | | | |
|---|---|---|---|---|---|
| CN | 121524783 | A | * | 2/2026 | |
| JP | 2025130785 | A | * | 9/2025 | ............. G01H 9/004 |
| KR | 20240030037 | A | * | 3/2024 | ............... G06N 3/08 |
| WO | WO-2019220609 | A1 | * | 1/2019 | ......... G06F 18/2433 |
| WO | 2020/044648 | A1 | | 3/2020 | |
| WO | WO-2024123310 | A1 | * | 6/2024 | ............. G10L 25/51 |

* cited by examiner

EVENT RECOGNITION APPARATUS, EVENT RECOGNITION METHOD, AND NON-TRANSITORY COMPUTER-READABLE MEDIUM

INCORPORATION BY REFERENCE

This application is based upon and claims the benefit of priority from Japanese patent application No. 2023-089414, filed on May 31, 2023, the disclosure of which is incorporated herein in its entirety by reference.

TECHNICAL FIELD

The present disclosure relates to an event recognition apparatus, an event recognition method, and a non-transitory computer-readable medium.

BACKGROUND ART

Optical fiber sensing, represented by distributed acoustic sensing (DAS), is capable of sensing sound and vibration that occur at a point along an optical fiber.

In recent years, a technique in which an observation signal indicating sound or vibration that occurs at a point along an optical fiber and is detected by optical fiber sensing is acquired, and an event such as an abnormality that occurs at the point along the optical fiber is recognized based on the acquired observation signal has been proposed.

Further, as a technique of recognizing an event, based on an observation signal acquired by optical fiber sensing, there is a technique of performing model learning on an observation signal, generating a machine learning model, and recognizing an event by using the generated machine learning model. For example, International Patent Publication No. WO2020/044648 discloses a technique of recognizing an event by using a machine learning model generated by supervised learning.

Meanwhile, as a method of machine learning, in addition to the above-described supervised learning, there are transfer learning, fine-tuning, domain adaptation, self-supervised learning, and the like. When these methods are used for optical fiber sensing, any of the methods requires, for model learning, an observation signal acquired by optical fiber sensing.

However, the observation signal acquired by optical fiber sensing is a low-quality signal due to low signal-to-noise ratio (SNR) and non-uniform sensitivity caused by optical noise (in which high-whiteness shot noise is dominant).

Therefore, since the number of observation signals effective for model learning is small in a first place, there is a problem that it is difficult to generate a machine learning model by performing model learning using the observation signal.

Therefore, a technique that enables recognition of an event without performing model learning by using an observation signal acquired by optical fiber sensing is desired.

SUMMARY

Therefore, in view of the problem described above, an object of the present disclosure is to provide an event recognition apparatus, an event recognition method, and a non-transitory computer-readable medium that are capable of recognizing an event without performing model learning by using an observation signal acquired by optical fiber sensing.

In a first example aspect, an event recognition apparatus includes:

at least one memory configured to store a group of instructions; and at least one processor configured in such a way as to, by executing the group of instructions, acquire an observation signal indicating sound or vibration that occurs at a point along an optical fiber and is detected by optical fiber sensing, and also acquire a noise signal indicating optical noise being present at a point along the optical fiber, by using statistical information of a sound signal or a vibration signal acquired by a sound sensor or a vibration sensor, derive, from the observation signal, a posterior probability that at least one event occurs at a point along the optical fiber, and also derive, from the noise signal, a posterior probability that the at least one event occurs at a point along the optical fiber, and compare a posterior probability derived from the observation signal with a posterior probability derived from the noise signal, derive, from a result of the comparison, a posterior probability that the at least one event occurs at a point along the optical fiber, and output a result of the derivation.

In a second example aspect, an event recognition method is an event recognition method using an event recognition apparatus, including:

an acquisition step of acquiring an observation signal indicating sound or vibration that occurs at a point along an optical fiber and is detected by optical fiber sensing, and also acquiring a noise signal indicating optical noise being present at a point along the optical fiber;

a derivation step of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison step of comparing a posterior probability derived from the observation signal with a posterior probability derived from the noise signal, deriving, from a result of the comparison, a posterior probability that the at least one event occurs at a point along the optical fiber, and outputting a result of the derivation.

In a third example aspect, a non-transitory computer-readable medium is a non-transitory computer-readable medium storing a program causing a computer to execute:

an acquisition procedure of acquiring an observation signal indicating sound or vibration that occurs at a point along an optical fiber and is detected by optical fiber sensing, and also acquiring a noise signal indicating optical noise being present at a point along the optical fiber;

a derivation procedure of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison procedure of comparing a posterior probability derived from the observation signal with a posterior probability derived from the noise signal, deriving, from a result of the comparison, a posterior probability that the at least one event occurs at a point along the optical fiber, and outputting a result of the derivation.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Hereinafter, example embodiments of the present disclosure is be described with reference to the drawings. Note that, the following description and the drawings are omitted and simplified as appropriate for clarity of description. In the following drawings, the same components are denoted by the same reference signs, and redundant descriptions are omitted as necessary. Further, a specific numerical value and the like referred to in the following description are merely examples for facilitating understanding of the present disclosure, and are not limited thereto.

Outline of Each Example Embodiment

Before describing details of each example embodiment of the present disclosure, an outline of each example embodiment is described.

Figure 1:
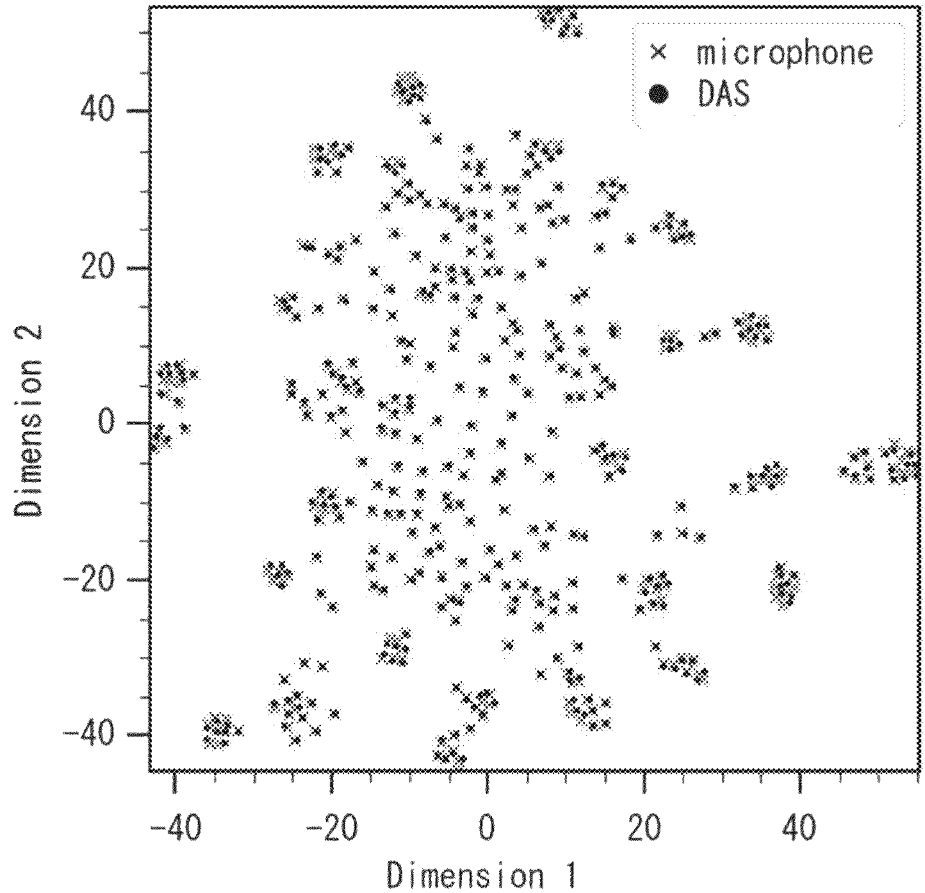
FIG. 1 is a diagram illustrating an example in which distribution of sound signals acquired by a microphone is compared with distribution of observation signals indicating sound acquired by DAS.

First, with reference to FIG. 1, an example in which distribution of sound signals acquired by a microphone is compared with distribution of observation signals indicating sound acquired by DAS is described. In FIG. 1, the distribution of the observation signals is distribution after influence of optical noise is eliminated.

As illustrated in FIG. 1, it can be seen that, when the influence of the optical noise is eliminated, the distribution of the observation signals indicating of the sound acquired by DAS is very similar to the distribution of the sound signal acquired by the microphone.

In addition, in a market, statistical information such as open source data and a machine learning model related to a sound signal or a vibration signal acquired by a sound sensor such as a microphone or by a vibration sensor is distributed.

Therefore, in each example embodiment described below, statistical information of a sound signal or a vibration signal acquired by a sound sensor or a vibration sensor, distributed on a market, is used. This eliminates necessity for model learning using an observation signal acquired by optical fiber sensing.

Further, in each example embodiment described below, by using the above-described statistical information, a posterior probability that an event occurs is derived from each of an observation signal indicating sound or vibration detected by optical fiber sensing and a noise signal indicating optical noise. Then, the posterior probability derived from the observation signal is compared with the posterior probability derived from the noise signal, and finally, a posterior probability that the event occurs is derived from the comparison result. This eliminates influence of the optical noise and improves performance of event recognition.

Hereinafter, example embodiments of the present disclosure is described.

Example Embodiment 1

First, a configuration example of an event recognition apparatus 10 according to the example embodiment 1 is described with reference to FIG. 2. The example embodiment 1 is an example in which a machine learning model learned using a sound signal or a vibration signal is used as statistical information of the sound signal or the vibration signal acquired by a sound sensor or a vibration sensor.

Figure 2:
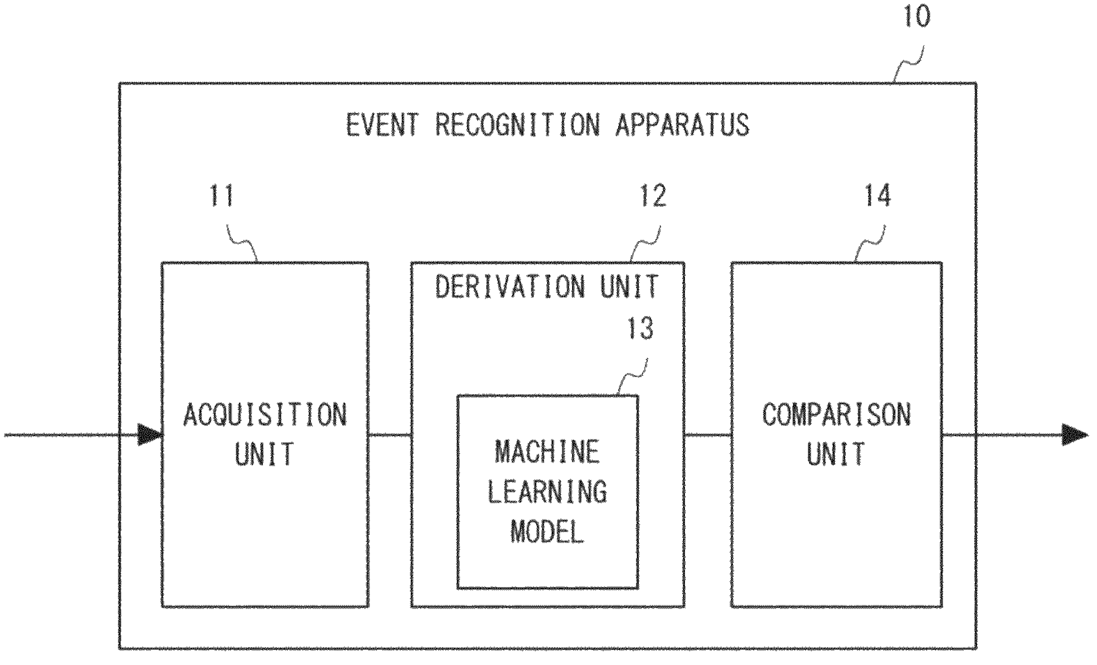
FIG. 2 is a block diagram illustrating a configuration example of an event recognition apparatus according to an example embodiment 1.

As illustrated in FIG. 2, the event recognition apparatus 10 according to the example embodiment 1 includes an acquisition unit 11, a derivation unit 12, and a comparison unit 14.

The acquisition unit 11 acquires an observation signal indicating sound or vibration that occurs at each point along an optical fiber and is detected by optical fiber sensing. For example, the acquisition unit 11 may acquire an observation signal from a sensing apparatus such as a DAS apparatus. Further, for example, the observation signal may be a time-domain signal $R^T$ indicating a temporal change in intensity of sound or vibration that occurs at each point along the optical fiber. Alternatively, the observation signal may be a frequency-domain signal $C^{T \times F}$ acquired by Fourier-transforming the time-domain signal $R^T$.

Further, the acquisition unit 11 acquires a noise signal indicating optical noise present at any point along the optical fiber. The optical noise is dominated by high-whiteness shot noise. When a type of the optical noise or a time interval in which the optical noise is present is unknown, the acquisition unit 11 may acquire any noise signal simulating any type of optical noise, from any apparatus. Alternatively, when a time interval in which an event occurs is known, the acquisition unit 11 may acquire, as the noise signal, an observation signal in a time interval in which the event does not occur, from a sensing apparatus such as a DAS apparatus.

The derivation unit 12 retains a machine learning model 13 that is distributed on a market and is an example of statistical information of a sound signal or a vibration signal acquired by a sound sensor or a vibration sensor.

The machine learning model 13 is a model that outputs, regarding an input signal, a posterior probability that at least one event occurs.

The machine learning model 13 is a model learned by using the sound signal or the vibration signal acquired by the sound sensor or the vibration sensor as an input signal.

The sound sensor is, for example, a microphone that acquires a sound signal. The vibration sensor is, for example, an acceleration sensor or a hydrophone that acquires a vibration signal.

By using the machine learning model 13, the derivation unit 12 derives, for each point along the optical fiber, a posterior probability that at least one event occurs at the point, from an observation signal of the point acquired by the acquisition unit 11. Specifically, the derivation unit 12 inputs, for each point, an observation signal of the point as an input signal to the machine learning model 13, and acquires, as an output signal from the machine learning model 13, a posterior probability that at least one event occurs at the point.

Further, by using the machine learning model 13, the derivation unit 12 derives, from a noise signal that indicates optical noise present at any point along the optical fiber and is acquired by the acquisition unit 11, a posterior probability that at least one event occurs at the any point. Specifically, the derivation unit 12 inputs a noise signal of any point to the machine learning model 13 as an input signal, and acquires, as an output signal from the machine learning model 13, a posterior probability that at least one event occurs at the any point.

The comparison unit 14 compares, for each point along the optical fiber, the posterior probability derived by the derivation unit 12 from the observation signal of the point along the optical fiber with the posterior probability derived by the derivation unit 12 from the noise signal of the point along the optical fiber. Then, the comparison unit 14 finally derives, from a result of the comparison, a posterior probability that the at least one event occurs at the point. Further, the comparison unit 14 outputs, as an event recognition result, the posterior probability that the at least one event occurs, which is derived for each point, to an outside of the event recognition apparatus 10.

Next, a schematic operation example of the event recognition apparatus 10 according to the example embodiment 1 is described with reference to FIG. 3. Note that, in FIG. 3, it is assumed that the acquisition unit 11 has already acquired an observation signal of each point along the optical fiber and a noise signal of any point, and a subsequent operation example is described (the same applies to FIGS. 4 and 5 described later).

Figure 3:
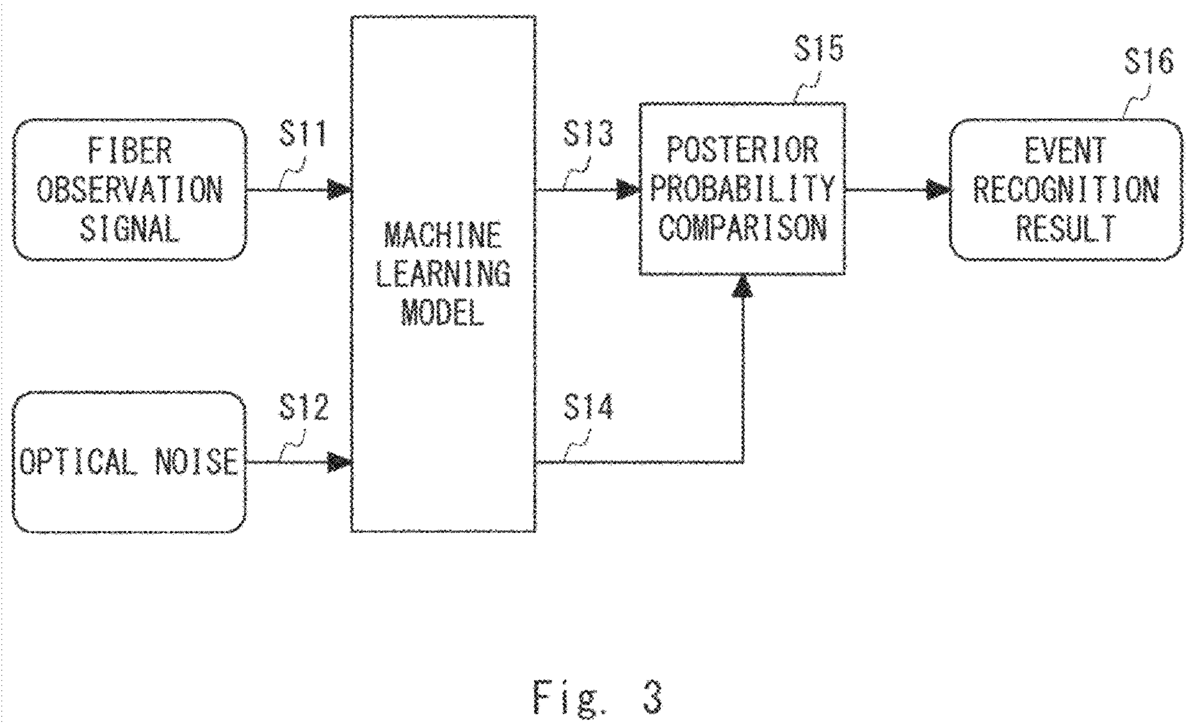
FIG. 3 is a diagram for describing a schematic operation example of the event recognition apparatus according to the example embodiment 1.

As illustrated in FIG. 3, the derivation unit 12 inputs, for each point, an observation signal of the point to the machine learning model 13 as an input signal (step S11), and acquires, as an output signal from the machine learning model 13, a posterior probability that at least one event occurs at the point (step S13).

Further, the derivation unit 12 inputs a noise signal of any point to the machine learning model 13 as an input signal (step S12), and acquires, as an output signal from the machine learning model 13, a posterior probability that at least one event occurs at the any point (step S14).

The comparison unit 14 compares, for each point, the posterior probability derived from the observation signal of the point with the posterior probability derived from the noise signal, and finally derives a posterior probability that the at least one event occurs at the point, from a result of the comparison (step S15).

Thereafter, the comparison unit 14 outputs, as an event recognition result, the posterior probability that the at least one event occurs, which is derived for each point, to an outside of the event recognition apparatus 10 (step S16).

Next, a specific operation example of the event recognition apparatus 10 according to the example embodiment 1 is described.

(1) Specific Operation Example 1

First, a specific operation example 1 of the event recognition apparatus 10 according to the example embodiment 1 is described with reference to FIG. 4.

This operation example 1 is an example in which a type of optical noise present at any point along the optical fiber and a time interval in which the optical noise is present are unknown.

In the case of the operation example 1, the acquisition unit 11 acquires any noise signal simulating any type of optical noise, from any apparatus. For example, the noise signal in the operation example 1 is a signal ($N(\mu, \sqrt{\mu})$) according to the central limit theorem when the number of photons detected is Poisson distribution and the number of detections is large.

Further, the acquisition unit 11 acquires the above-described time-domain signal $R^T$ or the frequency-domain signal $C^{T \times F}$ as an observation signal of each point along the optical fiber, from a sensing apparatus such as a DAS apparatus.

Figure 4:
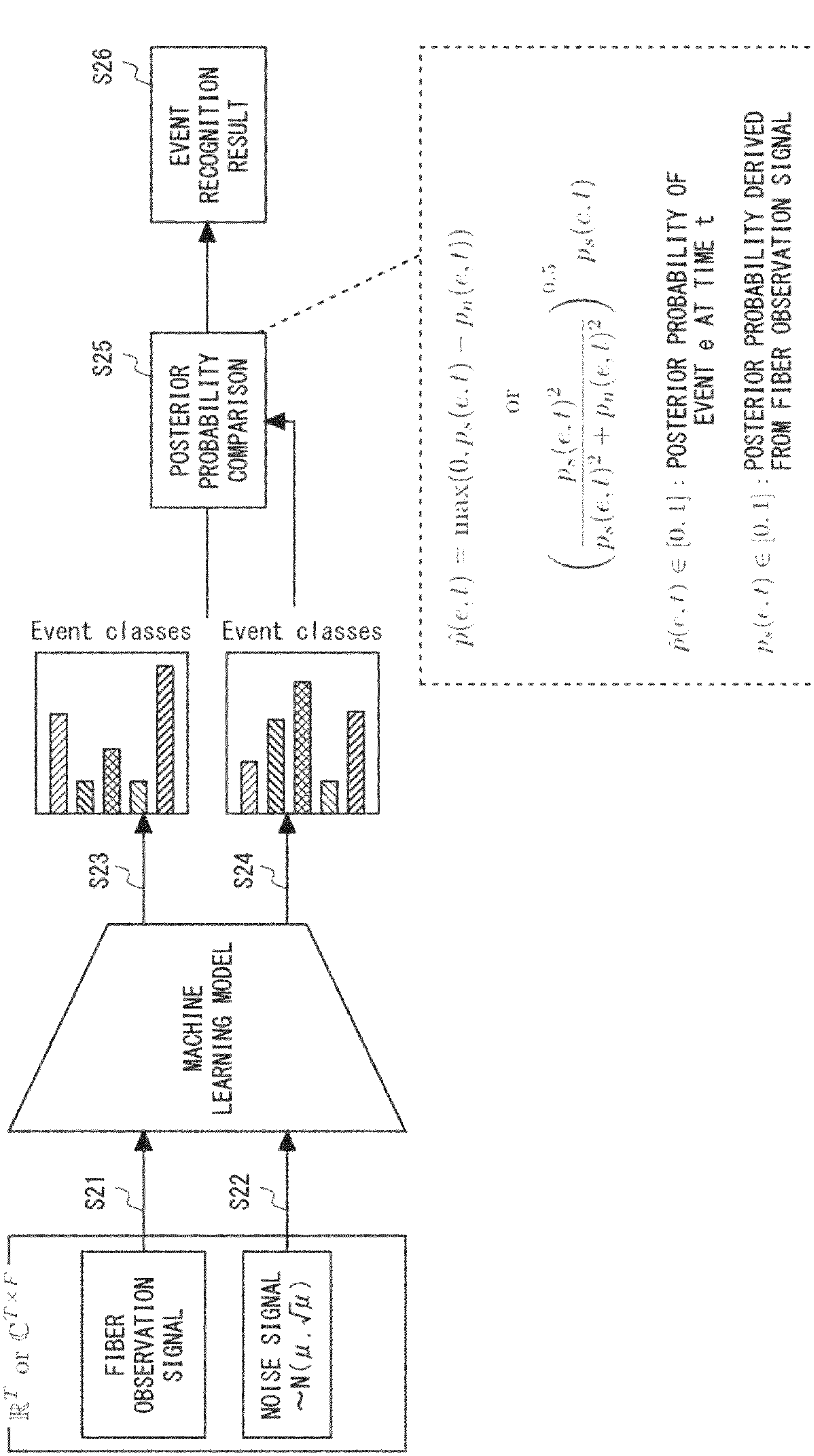
FIG. 4 is a diagram for describing a specific operation example of the event recognition apparatus according to the example embodiment 1.

As illustrated in FIG. 4, the derivation unit 12 inputs, for each point, the observation signal $R^T$ or $C^{T \times F}$ of the point to the machine learning model 13, as an input signal (step S21). As a result, for each point, the derivation unit 12 acquires, as an output signal from the machine learning model 13, a posterior probability that each of five events occurs at the point (step S23). Among the posterior probabilities acquired herein, for example, a posterior probability that an event e among the five events occurs at a time t at a certain point is represented by the following Math (1).

[Math 1]

$$p_s(e, t) \in [0,1] \tag{1}$$

Further, the derivation unit 12 inputs the noise signal $N(\mu, \sqrt{\mu})$ at any point to the machine learning model 13, as an input signal (step S22). As a result, the derivation unit 12 acquires, as an output signal from the machine learning model 13, a posterior probability that each of the five events occurs at the any point (step S24). Among the posterior probabilities acquired herein, for example, a posterior probability that the event e of the five events occurs at the time t at the any point is expressed by the following Math (2).

[Math 2]

$$p_n(e, t) \in [0,1] \quad (2)$$

The comparison unit 14 compares, for each point, the posterior probability derived from the observation signal of the point with the posterior probability derived from the noise signal of the point, and finally derives a posterior probability that each of the five events occurs at the point, from a result of the comparison (step S25). Among the posterior probabilities obtained herein, for example, a posterior probability that the event e among the five events occurs at the time t at a certain point is expressed by the following Math (3).

[Math 3]

$$\hat{p}(e, t) \in [0,1] \quad (3)$$

Herein, it is assumed that the comparison unit 14 derives the posterior probability expressed by the above-described Math (3) by using, for example, the following Math (4) or Math (5).

[Math 4]

$$\hat{p}(e, t) = \max(0, p_s(e, t) - p_n(e, t)) \text{ or} \quad (4)$$

[Math 5]

$$\hat{p}(e, t) = \left(\frac{p_s(e, t)^2}{p_s(e, t)^2 + p_n(e, t)^2}\right)^{0.5} p_s(e, t) \quad (5)$$

Thereafter, the comparison unit 14 outputs, as an event recognition result, the posterior probability that each of the five events occurs, which is derived for each point, to an outside of the event recognition apparatus 10 (step S26).

In the operation example 1, the derivation unit 12 uses the machine learning model 13 without relearning. Therefore, basically, the derivation unit 12 does not perform model learning using an observation signal. However, the present disclosure is not limited thereto, and the derivation unit 12 may relearn the machine learning model 13 by performing few-shot learning using a small number of observation signals.

In addition, in a case in which a specific optical noise is not uniquely determined, the derivation unit 12 may use noise signals of a plurality of types of optical noises acquired in advance by the acquisition unit 11, and the comparison unit 14 may compare each posterior probability derived from the plurality of types of noise signals with the posterior probability derived from the observation signal, and thereby recognize an event.

In addition, since the derivation of the posterior probability is a calculation at a probability level, the posterior probability is always a value of 0 to 1. Therefore, the derivation unit 12 may use each of a plurality of the machine learning models 13, and the comparison unit 14 may recognize an event by comparing the posterior probabilities derived by using each of the plurality of machine learning models 13.

Further, the derivation unit 12 and the comparison unit 14 may not derive the posterior probabilities for all the five events, and for an event of any event class, may perform denoising in which the event is masked without deriving a posterior probability.

(2) Specific Operation Example 2

Next, a specific operation example 2 of the event recognition apparatus 10 according to the example embodiment 1 is described with reference to FIG. 5.

The operation example 2 is an example in which a time interval in which an event occurs at any point along the optical fiber is known. In other words, the operation example 2 is an example in which a time interval in which optical noise is present at any point is known.

In the operation example 2, the acquisition unit 11 obtains, from a sensing apparatus such as a DAS apparatus, a time-domain signal $R^T$ or a frequency-domain signal $C^{T \times F}$, which is an observation signal in a time period in which no event has occurred, as a noise signal at any point.

Further, the acquisition unit 11 acquires the above-described time-domain signal $R^T$ or the frequency-domain signal $C^{T \times F}$ as an observation signal of each point, from a sensing apparatus such as a DAS apparatus.

Figure 5:
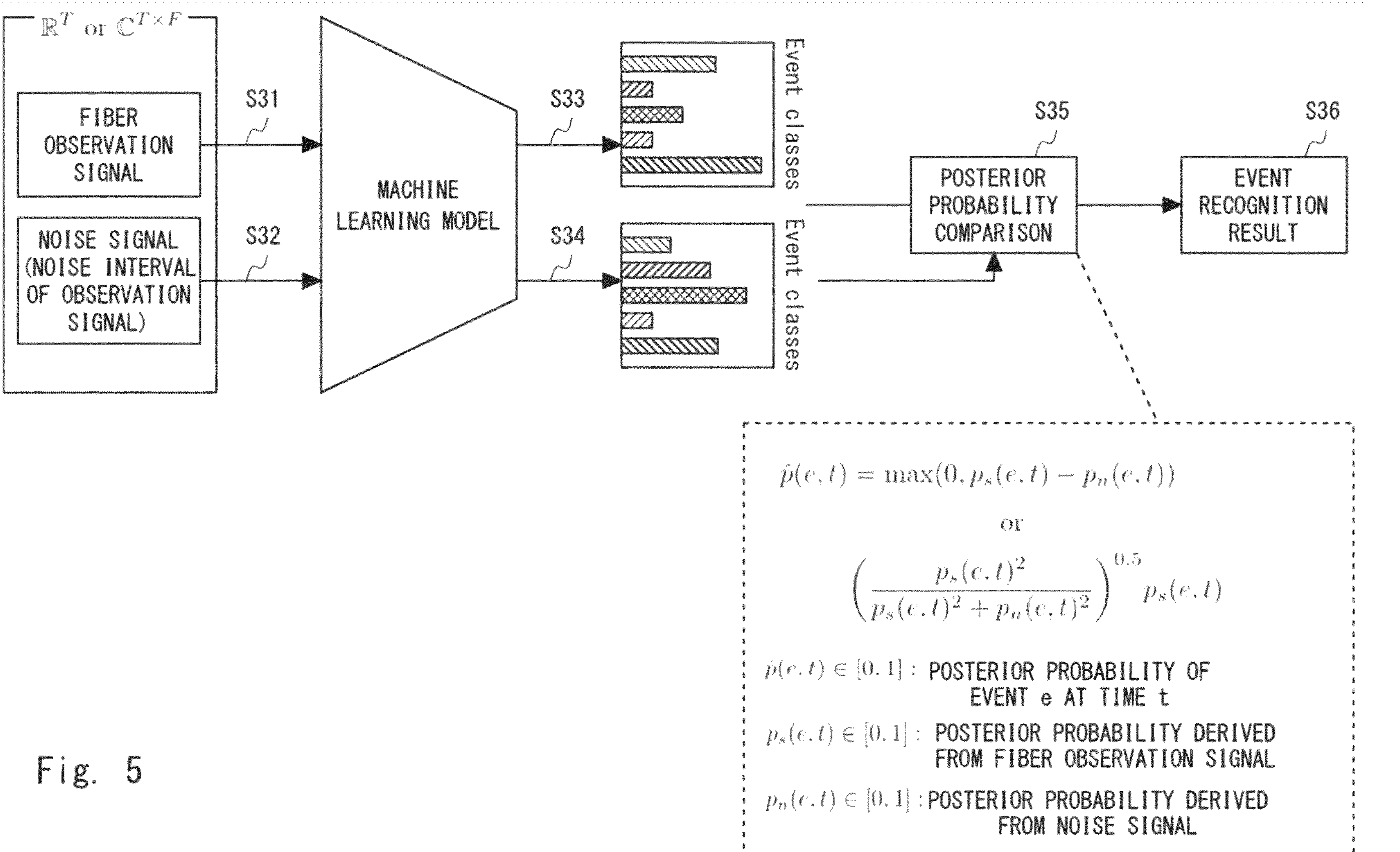
FIG. 5 is a diagram for describing a specific operation example of the event recognition apparatus according to the example embodiment 1.

As illustrated in FIG. 5, the derivation unit 12 inputs, for each point, the observation signal $R^T$ or the $C^{T \times F}$ of the point to the machine learning model 13, as an input signal (step S31). As a result, for each point, the derivation unit 12 acquires, as an output signal from the machine learning model 13, a posterior probability that each of the five events occurs at the point (step S33). It is assumed that, among the posterior probabilities acquired herein, for example, a posterior probability that the event e among the five events occurs at the time t at a certain point is expressed as Math (1) described above.

Further, the derivation unit 12 inputs the noise signal $N(\mu, \sqrt{\mu})$ of any point to the machine learning model 13, as an input signal (step S32). As a result, the derivation unit 12 acquires, as an output signal from the machine learning model 13, a posterior probability that each of the five events occurs at the any point (step S34). It is assumed that, among the posterior probabilities acquired herein, for example, a posterior probability that the event e among the five events occurs at the time t at the any point is expressed as Math (2) described above.

The comparison unit 14 compares, for each point, the posterior probability derived from the observation signal of the point with the posterior probability derived from the noise signal, and finally derives a posterior probability that each of the five events occurs at the point, from a result of the comparison (step S35). It is assumed that, among the posterior probabilities acquired herein, for example, a posterior probability that the event e among the five events occurs at the time t at a certain point is represented as Math (3) described above.

Herein, it is also assumed that the comparison unit 14 derives the posterior probability expressed by the above-described Math (3) by using, for example, the above-described Math (4) or Math (5).

Thereafter, the comparison unit 14 outputs, as an event recognition result, the posterior probability that each of the five events occurs, which is derived for each point, to an outside of the event recognition apparatus 10 (step S36).

In the operation example 2, the derivation unit 12 uses the machine learning model 13 without relearning. Therefore, basically, the derivation unit 12 does not perform model learning using an observation signal. However, the present disclosure is not limited thereto, and the derivation unit 12 may relearn the machine learning model 13 by performing few-shot learning using a small number of observation signals.

Further, the derivation unit 12 and the comparison unit 14 may not derive the posterior probability for all the five events, and for an event of any event class, may perform denoising may perform denoising in which the event is masked without deriving a posterior probability.

Figure 6:
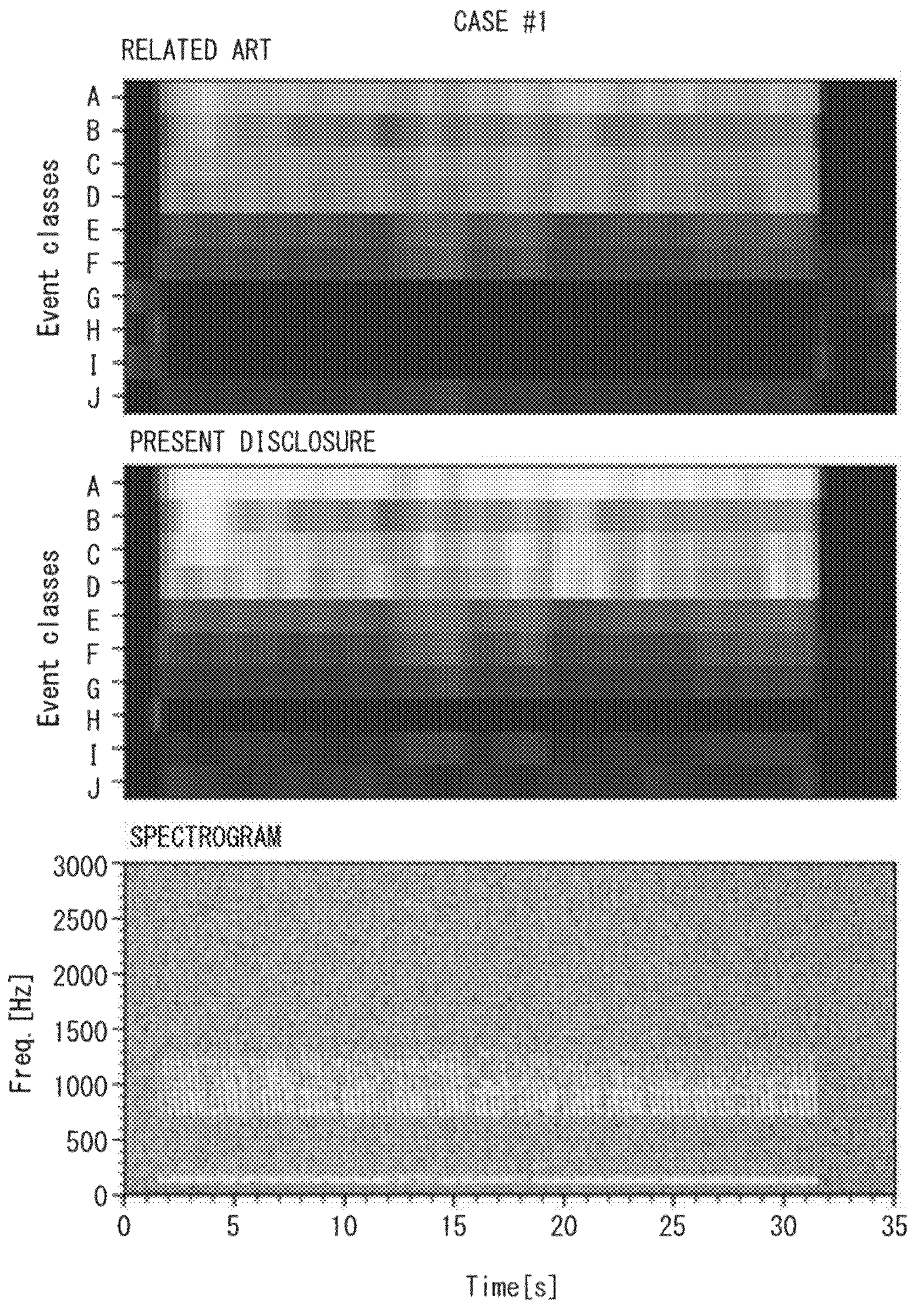
FIG. 6 is a diagram for describing an example of an event recognition result acquired by the event recognition apparatus according to the example embodiment 1 in comparison with an event recognition result acquired by a related art.
Figure 7:
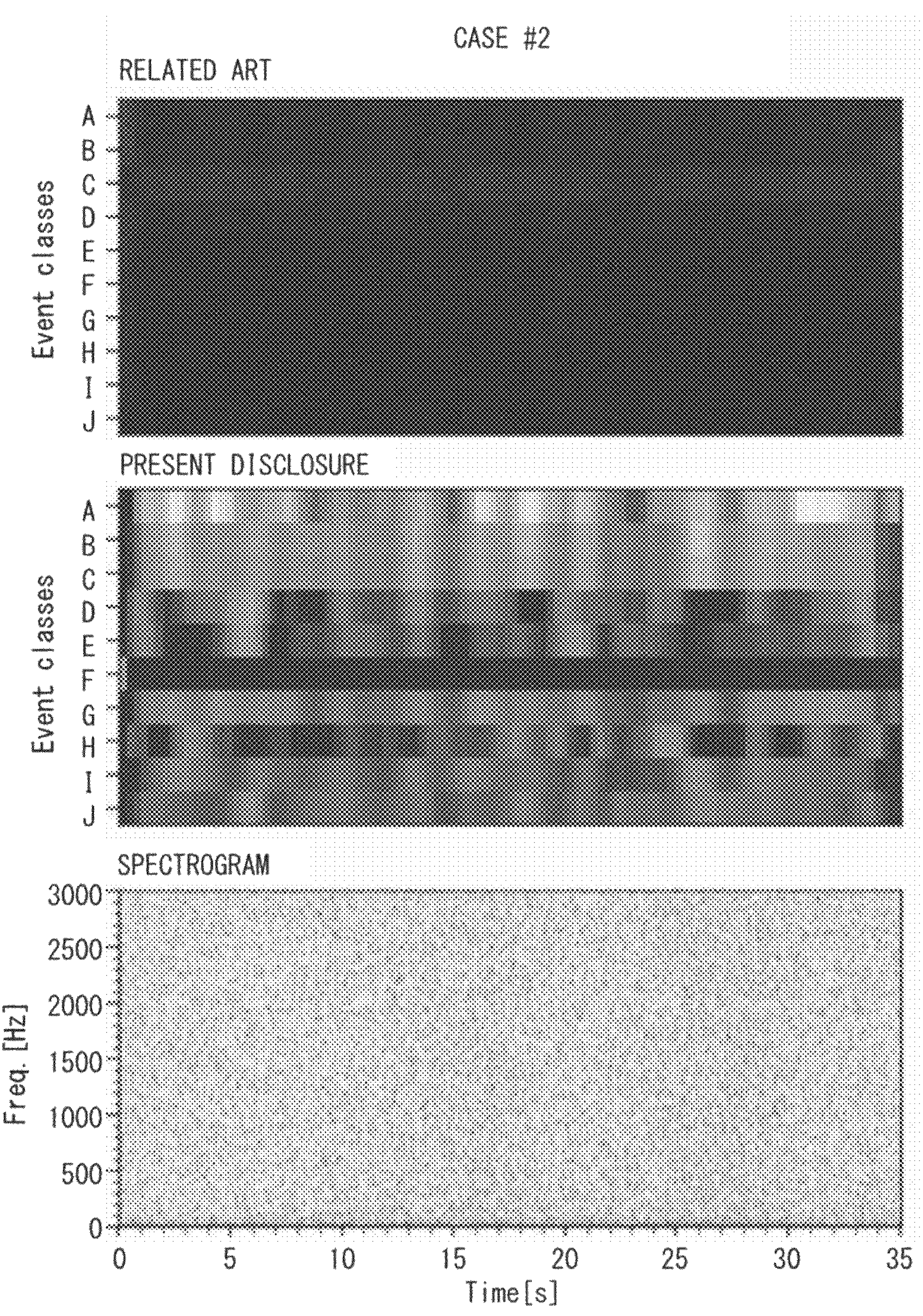
FIG. 7 is a diagram form describing an example of an event recognition result acquired by the event recognition apparatus according to the example embodiment 1 in comparison with an event recognition result acquired by the related art.

Next, with reference to FIGS. 6 and 7, an example of a result of event recognition by the event recognition apparatus 10 according to the example embodiment 1 is described in comparison with a result of event recognition by a related art.

Note that, FIGS. 6 and 7 each illustrate, from top to bottom, an event recognition result for a certain point according to the related art, an event recognition result for the same point according to the example embodiment 1, and a spectrogram of the same point input as an observation signal to the machine learning model 13 when event recognition is performed. The spectrogram corresponds to the frequency-domain signal $C^{T \times F}$ described above.

In addition, in FIGS. 6 and 7, it is assumed that the related art is a technique of outputting, as an event recognition result, a posterior probability derived from an observation signal, without performing processing of deriving a posterior probability from a noise signal indicating optical noise and processing of comparing the posterior probability derived from the observation signal with the posterior probability derived from the noise signal. In other words, in the example in FIG. 3, the related art is assumed to be a technique of outputting, as the event recognition result in step S16, the posterior probability derived from the observation signal in step S13.

Also, FIGS. 6 and 7, are different from each other in the spectrograms, and FIG. 6 is referred to as a case #1 and FIG. 7 is referred to as a case #2.

In FIGS. 6 and 7, horizontal axes of the three drawings indicate time, vertical axes of the upper two drawings indicate an event class of each event, and a vertical axis of the bottom drawing indicates frequency.

Also, in FIGS. 6 and 7, the upper two drawings illustrate that a lighter color indicates a higher posterior probability, and a darker color indicates a lower posterior probability.

As illustrated in FIG. 6, in the case #1, the related art appears darker as a whole as compared with the example embodiment 1. From this, it can be seen that the related art is influenced by optical noise, and event recognition performance is clearly poor. In other words, it can be seen that in the example embodiment 1, the influence of the optical noise is eliminated, and the event recognition performance is clearly improved.

Further, as illustrated in FIG. 7, it can be seen that the case #2 also has a similar tendency as the case #1.

As described above, according to the example embodiment 1, the acquisition unit 11 acquires an observation signal indicating sound or vibration that occurs at a point along the optical fiber and is detected by optical fiber sensing, and acquires a noise signal indicating optical noise present at the point along the optical fiber. The derivation unit 12 derives, from each of the observation signal and the noise signal, a posterior probability that at least one event occurs at the point along the optical fiber, by using the machine learning model 13 learned by using a sound signal or s vibration signal acquired by a sound sensor or a vibration sensor. The comparison unit 14 compares the posterior probability derived from the observation signal with the posterior probability derived from the noise signal, derives, from a result of the comparison, a posterior probability that the at least one event occurs at the point along the optical fiber, and outputs the derived posterior probability as an event recognition result.

As described above, according to the example embodiment 1, the machine learning model 13 learned by using the sound signal or the vibration signal acquired by the sound sensor or the vibration sensor is used. This eliminates necessity for model learning using an observation signal acquired by optical fiber sensing.

Further, according to the example embodiment 1, a posterior probability that an event occurs at a point along the optical fiber is derived from each of the observation signal and the noise signal, by using the machine learning model 13. Then, the posterior probability derived from the observation signal is compared with the posterior probability derived from the noise signal, and finally, a posterior probability that the event occurs is derived from a result of the comparison. As a result, influence of the optical noise is eliminated, and therefore performance of event recognition can be improved.

Example Embodiment 2

An example embodiment 2 corresponds to an example embodiment that is a higher-concept version of the example embodiment 1 described above.

First, a configuration example of an event recognition apparatus 20 according to the example embodiment 2 is described with reference to FIG. 8.

Figure 8:
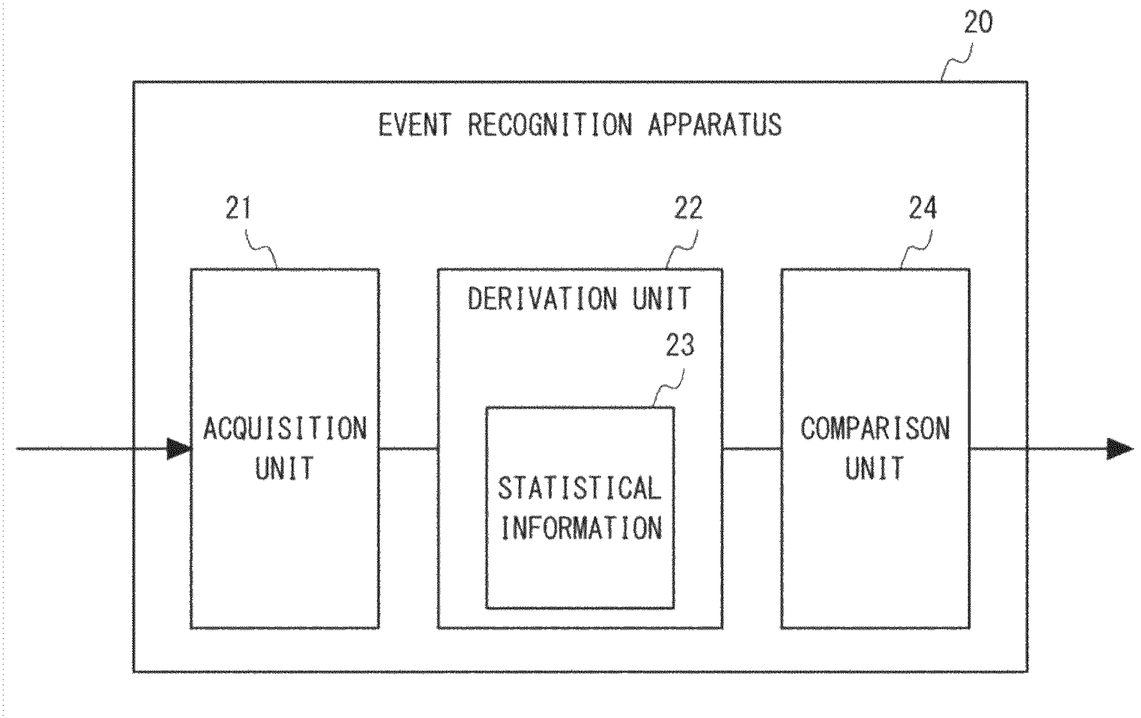
FIG. 8 is a block diagram illustrating a configuration example of an event recognition apparatus according to an example embodiment 2.

As illustrated in FIG. 8, the event recognition apparatus 20 according to the example embodiment 2 includes an acquisition unit 21, a derivation unit 22, and a comparison unit 24.

The acquisition unit 21 acquires an observation signal indicating sound or vibration that occurs at a point along an optical fiber and is detected by optical fiber sensing. Further, the acquisition unit 21 acquires a noise signal indicating optical noise present at the point along the optical fiber.

The derivation unit 22 retains statistical information 23 of a sound signal or s vibration signal acquired by a sound sensor or s vibration sensor. Then, by using the statistical information 23, the derivation unit 22 derives a posterior probability that at least one event occurs at the point along the optical fiber, from the observation signal, and derives a posterior probability that the at least one event occurs at the point along the optical fiber, from the noise signal.

The comparison unit 24 compares the posterior probability derived from the observation signal with the posterior probability derived from the noise signal, derives a posterior probability that the at least one event occurs at the point along the optical fiber, from a result of the comparison, and outputs a result of the derivation.

As described above, according to the example embodiment 2, the statistical information 23 of the sound signal or the vibration signal acquired by the sound sensor or the vibration sensor is used. This eliminates necessity for model learning using an observation signal acquired by optical fiber sensing.

Further, according to the example embodiment 2, the posterior probability that an event occurs at the point along the optical fiber is derived from each of the observation signal and the noise signal, by using the statistical information 23. Then, the posterior probability derived from the observation signal is compared with the posterior probability derived from the noise signal, and finally, a posterior probability that the event occurs is derived from a result of the comparison. As a result, influence of the optical noise is eliminated, and thereby performance of event recognition can be improved.

The statistical information 23 may be a machine learning model that outputs, regarding an input signal, a posterior probability that at least one event occurs. The machine learning model may be a model learned by a sound signal or a vibration signal acquired by a sound sensor or a vibration sensor. Further, the derivation unit 22 may derive a posterior probability from an observation signal by inputting the observation signal as an input signal to the machine learning model, and may derive a posterior probability from a noise signal by inputting the noise signal as an input signal to the machine learning model.

Further, the derivation unit 22 may use the machine learning model without relearning.

Further, in one example, the observation signal may be a signal indicating sound, and the machine learning model may be a model learned using a sound signal acquired by a microphone as a sound sensor.

In another example, the observation signal may be a signal indicating vibration, and the machine learning model may be a model learned using a vibration signal acquired by an acceleration sensor or a hydrophone as a vibration sensor.

Figure 9:
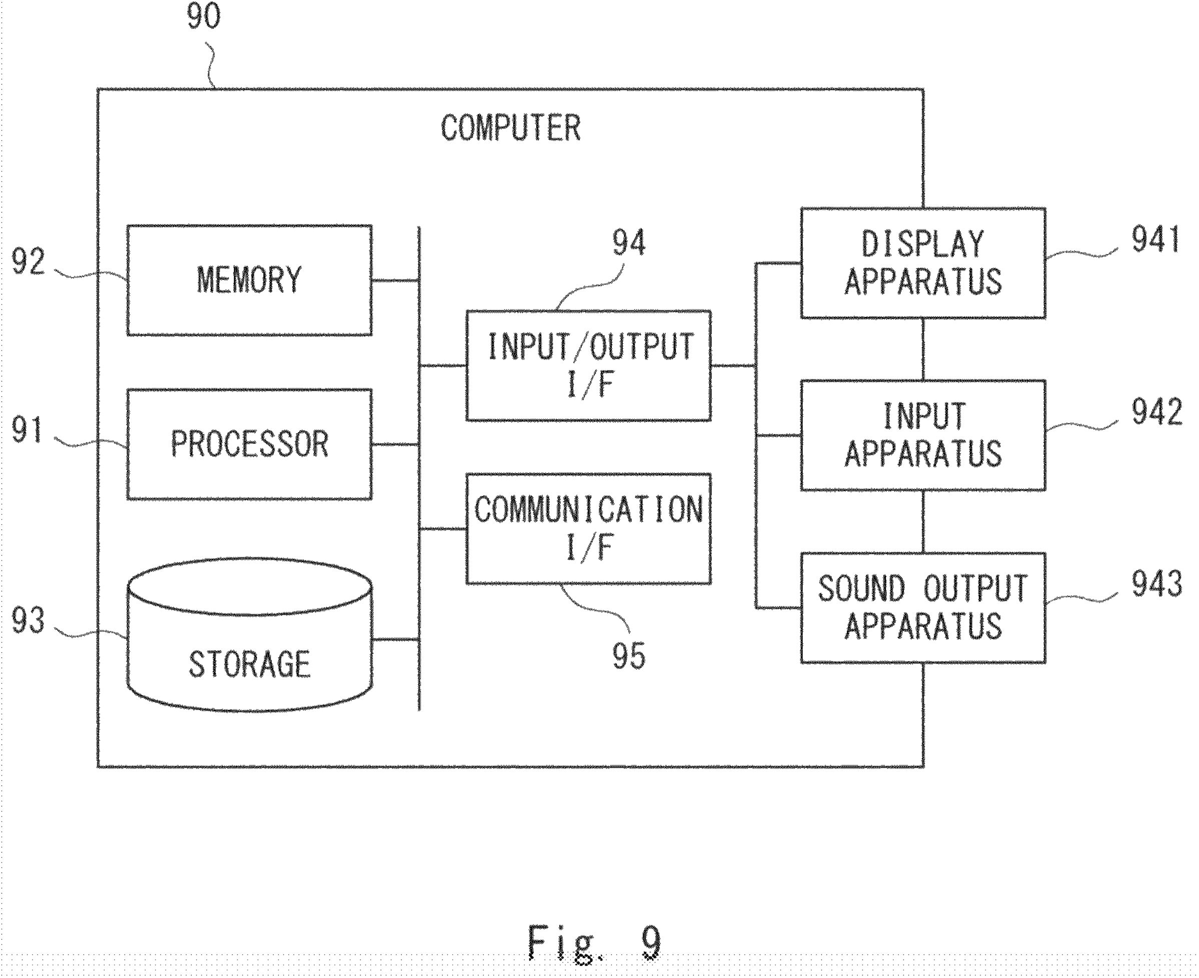
FIG. 9 is a block diagram illustrating an example of a hardware configuration of a computer that achieves the event recognition apparatus according to each of the example embodiments.

Hardware Configuration of Event Recognition Apparatus According to Example Embodiment Next, with reference to FIG. 9, a hardware configuration example of a computer that achieves the event recognition apparatuses 10 and 20 according to the above-described example embodiments 1 and 2 is described.

As illustrated in FIG. 9, a computer 90 includes a processor 91, a memory 92, a storage 93, an input/output interface (input/output I/F) 94, a communication interface (communication I/F) 95, and the like. The processor 91, the memory 92, the storage 93, the input/output interface 94, and the communication interface 95 are connected by a data transmission path for transmitting and receiving data to and from each other.

The processor 91 is, for example, an arithmetic processing apparatus such as a central processing unit (CPU) or a graphics processing unit (GPU). The memory 92 is, for example, a memory such as a random access memory (RAM) or a read only memory (ROM). The storage 93 is, for example, a storage apparatus such as a hard disk drive (HDD), a solid state drive (SSD), or a memory card. The storage 93 may be a memory such as a RAM or a ROM.

A program is stored in the storage 93. The program includes a group of instructions (or software codes) that, when loaded into a computer, cause the computer 90 to perform one or more functions of the event recognition apparatuses 10 and 20 described above. The components of the event recognition apparatuses 10 and 20 described above may be achieved by the processor 91 reading and executing the program stored in the storage 93. Further, the storage function of the above-described event recognition apparatuses 10 and 20 may be achieved by the memory 92 or the storage 93.

In addition, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 94 is connected to a display apparatus 941, an input apparatus 942, a sound output apparatus 943, and the like. The display apparatus 941 is an apparatus, such as a liquid crystal display (LCD), a cathode ray tube (CRT) display, or a monitor, that displays a screen relevant to rendering data processed by the processor 91. The input apparatus 942 is an apparatus that receives an operation input from an operator, and is, for example, a keyboard, a mouse, a touch sensor, or the like. The display apparatus 941 and the input apparatus 942 may be integrated and achieved as a touch panel. The sound output apparatus 943 is an apparatus, such as a speaker, that outputs sound relevant to sound data processed by the processor 91.

The communication interface 95 transmits and receives data to and from an external apparatus. For example, the communication interface 95 communicates with an external apparatus via a wired communication path or a wireless communication path.

Although the present disclosure has been described with reference to the example embodiments, the present disclosure is not limited to the above-described example embodiments. Various modifications that can be understood by a person skilled in the art within the scope of the present disclosure can be made to the configuration and details of the present disclosure. Each of the example embodiments can be combined with the other example embodiment as appropriate.

In addition, some or all of the above-described example embodiments may be described as the following supplementary notes, but the present disclosure is not limited thereto.

(Supplementary Note 1)

An event recognition apparatus including:

at least one memory configured to store a group of instructions; and at least one processor configured in such a way as to, by executing the group of instructions, acquire an observation signal indicating sound or vibration that occurs at a point along an optical fiber and is detected by optical fiber sensing, and also acquire a noise signal indicating optical noise being present at a point along the optical fiber, by using statistical information of a sound signal or a vibration signal acquired by a sound sensor or a vibration sensor, derive, from the observation signal, a posterior probability that at least one event occurs at a point along the optical fiber, and also derive, from the noise signal, a posterior probability that the at least one event occurs at a point along the optical signal, and compare a posterior probability derived from the observation signal with a posterior probability derived from the noise signal, derive, from a result of the comparison, a posterior probability that the at least one event occurs at a point along the optical fiber, and output a result of the derivation.

(Supplementary Note 2)

The event recognition apparatus according to supplementary note 1, wherein the statistical information is a machine learning model that outputs, regarding an input signal, a posterior probability that the at least one event occurs, the machine learning model is a model learned by using the sound signal or the vibration signal acquired by the sound sensor or the vibration sensor, and the at least one processor is further configured in such a way as to execute the group of instructions, and by inputting the observation signal as the input signal to the machine learning model, derive a posterior probability from the observation signal, and also, by inputting the noise signal as the input signal to the machine learning model, derive a posterior probability from the noise signal.

(Supplementary Note 3)

The event recognition apparatus according to supplementary note 2, wherein the at least one processor is further configured in such a way as to execute the group of instructions and use the machine learning model without relearning.

(Supplementary Note 4)

The event recognition apparatus according to supplementary note 2, wherein the observation signal is a signal indicating sound, and the machine learning model is a model learned by using a sound signal acquired by a microphone as the sound sensor.

(Supplementary Note 5)

The event recognition apparatus according to supplementary note 2, wherein the observation signal is a signal indicating vibration, and the machine learning model is a model learned by using a vibration signal acquired by an acceleration sensor or a hydrophone as the vibration sensor.

(Supplementary Note 6)

An event recognition method using an event recognition apparatus, including:

an acquisition step of acquiring an observation signal indicating sound or vibration that occurs at a point along an optical fiber and is detected by optical fiber sensing, and also acquiring a noise signal indicating optical noise being present at a point along the optical fiber;

a derivation step of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison step of comparing a posterior probability derived from the observation signal with a posterior probability derived from the noise signal, deriving, from a result of the comparison, a posterior probability that the at least one event occurs at a point along the optical fiber, and outputting a result of the derivation.

(Supplementary Note 7)

The event recognition method according to supplementary note 6, wherein the statistical information is a machine learning model that outputs, regarding an input signal, a posterior probability that the at least one event occurs, and the machine learning model is a model learned by using the sound signal or the vibration signal acquired by the sound sensor or the vibration sensor, the event recognition method further including, in the derivation step, by inputting the observation signal as the input signal to the machine learning model, deriving a posterior probability from the observation signal, and also, by inputting the noise signal as the input signal to the machine learning model, deriving a posterior probability from the noise signal.

(Supplementary Note 8)

The event recognition method according to supplementary note 7, further including, in the derivation step, using the machine learning model without relearning.

(Supplementary Note 9)

The event recognition method according to supplementary note 7, wherein the observation signal is a signal indicating sound, and the machine learning model is a model learned by using a sound signal acquired by a microphone as the sound sensor.

(Supplementary Note 10)

The event recognition method according to supplementary note 7, wherein the observation signal is a signal indicating vibration, and the machine learning model is a model learned by using a vibration signal acquired by an acceleration sensor or a hydrophone as the vibration sensor.

(Supplementary Note 11)

A non-transitory computer-readable medium, storing a program causing a computer to execute:

an acquisition procedure of acquiring an observation signal indicating sound or vibration that occurs at a point along an optical fiber and is detected by optical fiber sensing, and also acquiring a noise signal indicating optical noise being present at a point along the optical fiber;

a derivation procedure of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison procedure of comparing a posterior probability derived from the observation signal with a posterior probability derived from the noise signal, deriving, from a result of the comparison, a posterior probability that the at least one event occurs at a point along the optical fiber, and outputting a result of the derivation.

(Supplementary Note 12)

The non-transitory computer-readable medium according to supplementary note 11, wherein the statistical information is a machine learning model that outputs, regarding an input signal, a posterior probability that the at least one event occurs, the machine learning model is a model learned by using the sound signal or the vibration signal acquired by the sound sensor or the vibration sensor, and in the derivation procedure, by inputting the observation signal as the input signal to the machine learning model, a posterior probability is derived from the observation signal, and also, by inputting the noise signal as the input signal to the machine learning model, a posterior probability is derived from the noise signal.

(Supplementary Note 13)

The non-transitory computer-readable medium according to supplementary note 12, wherein, in the derivation procedure, the machine learning model is used without relearning.

(Supplementary Note 14)

The non-transitory computer-readable medium according to supplementary note 12, wherein the observation signal is a signal indicating sound, and the machine learning model is a model learned by using a sound signal acquired by a microphone as the sound sensor.

(Supplementary Note 15)

The non-transitory computer-readable medium according to supplementary note 12, wherein the observation signal is a signal indicating vibration, and the machine learning model is a model learned by using a vibration signal acquired by an acceleration sensor or a hydrophone as the vibration sensor.

What is claimed is:

1. An event recognition apparatus comprising:

at least one memory configured to store a group of instructions; and at least one processor configured in such a way as to, by executing the group of instructions, acquire an observation signal indicating sound or vibration that occurs at a point along an optical fiber and is detected by optical fiber sensing, and also acquire a noise signal indicating optical noise being present at a point along the optical fiber, by using statistical information of a sound signal or a vibration signal acquired by a sound sensor or a vibration sensor, derive, from the observation signal, a posterior probability that at least one event occurs at a point along the optical fiber, and also derive, from the noise signal, a posterior probability that the at least one event occurs at a point along the optical fiber, and compare a posterior probability derived from the observation signal with a posterior probability derived from the noise signal, derive, from a result of the comparison, a posterior probability that the at least one event occurs at a point along the optical fiber, and output a result of the derivation.

2. The event recognition apparatus according to claim 1, wherein the statistical information is a machine learning model that outputs, regarding an input signal, a posterior probability that the at least one event occurs, the machine learning model is a model learned by using the sound signal or the vibration signal acquired by the sound sensor or the vibration sensor, and the at least one processor is further configured in such a way as to execute the group of instructions, and by inputting the observation signal as the input signal to the machine learning model, derive a posterior probability from the observation signal, and also, by inputting the noise signal as the input signal to the machine learning model, derive a posterior probability from the noise signal.

3. The event recognition apparatus according to claim 2, wherein the at least one processor is further configured in such a way as to execute the group of instructions and use the machine learning model without relearning.

4. The event recognition apparatus according to claim 2, wherein the observation signal is a signal indicating sound, and the machine learning model is a model learned by using a sound signal acquired by a microphone as the sound sensor.

5. The event recognition apparatus according to claim 2, wherein the observation signal is a signal indicating vibration, and the machine learning model is a model learned by using a vibration signal acquired by an acceleration sensor or a hydrophone as the vibration sensor.

6. An event recognition method using an event recognition apparatus, comprising:

an acquisition step of acquiring an observation signal indicating sound or vibration that occurs at a point along an optical fiber and is detected by optical fiber sensing, and also acquiring a noise signal indicating optical noise being present at a point along the optical fiber;

a derivation step of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison step of comparing a posterior probability derived from the observation signal with a posterior probability derived from the noise signal, deriving, from a result of the comparison, a posterior probability that the at least one event occurs at a point along the optical fiber, and outputting a result of the derivation.

7. The event recognition method according to claim 6, wherein the statistical information is a machine learning model that outputs, regarding an input signal, a posterior probability that the at least one event occurs, and the machine learning model is a model learned by using the sound signal or the vibration signal acquired by the sound sensor or the vibration sensor, the event recognition method further comprising, in the derivation step, by inputting the observation signal as the input signal to the machine learning model, deriving a posterior probability from the observation signal, and also, by inputting the noise signal as the input signal to the machine learning model, deriving a posterior probability from the noise signal.

8. The event recognition method according to claim 7, further comprising, in the derivation step, using the machine learning model without relearning.

9. The event recognition method according to claim 7, wherein the observation signal is a signal indicating sound, and the machine learning model is a model learned by using a sound signal acquired by a microphone as the sound sensor.

10. The event recognition method according to claim 7, wherein the observation signal is a signal indicating vibration, and the machine learning model is a model learned by using a vibration signal acquired by an acceleration sensor or a hydrophone as the vibration sensor.

11. A non-transitory computer-readable medium, storing a program causing a computer to execute:

an acquisition procedure of acquiring an observation signal indicating sound or vibration that occurs at a point along an optical fiber and is detected by optical fiber sensing, and also acquiring a noise signal indicating optical noise being present at a point along the optical fiber;

a derivation procedure of deriving, by using statistical information of a sound signal or a vibration signal acquired by a sound sensor or a vibration sensor, from the observation signal, a posterior probability that at least one event occurs at a point along the optical fiber, and also deriving, from the noise signal, a posterior probability that the at least one event occurs at a point along the optical fiber; and a comparison procedure of comparing a posterior probability derived from the observation signal with a posterior probability derived from the noise signal, deriving, from a result of the comparison, a posterior probability that the at least one event occurs at a point along the optical fiber, and outputting a result of the derivation.

12. The non-transitory computer-readable medium according to claim 11, wherein the statistical information is a machine learning model that outputs, regarding an input signal, a posterior probability that the at least one event occurs, the machine learning model is a model learned by using the sound signal or the vibration signal acquired by the sound sensor or the vibration sensor, and in the derivation procedure, by inputting the observation signal as the input signal to the machine learning model, a posterior probability is derived from the observation signal, and also, by inputting the noise signal as the input signal to the machine learning model, a posterior probability is derived from the noise signal.

13. The non-transitory computer-readable medium according to claim 12, wherein, in the derivation procedure, the machine learning model is used without relearning.

14. The non-transitory computer-readable medium according to claim 12, wherein the observation signal is a signal indicating sound, and the machine learning model is a model learned by using a sound signal acquired by a microphone as the sound sensor.

15. The non-transitory computer-readable medium according to claim 12, wherein the observation signal is a signal indicating vibration, and the machine learning model is a model learned by using a vibration signal acquired by an acceleration sensor or a hydrophone as the vibration sensor.

* * * * *